United States Patent [19]
Tallman

[11] Patent Number: 5,560,117
[45] Date of Patent: Oct. 1, 1996

[54] DECK BOARD OR LIKE SPACER

[76] Inventor: Brett Tallman, 404 Central Ave. #1, Whitefish, Mont. 59937

[21] Appl. No.: 296,593

[22] Filed: Aug. 29, 1994

[51] Int. Cl.⁶ .................................................. G01B 1/00
[52] U.S. Cl. ........................... 33/526; 33/645; 52/DIG. 1
[58] Field of Search ............................. 33/180, 168, 526, 33/613, 645, 562, 527; 273/32.5, 33, 147; 606/234; D24/194; D21/95; 446/256, 259

[56] References Cited

U.S. PATENT DOCUMENTS

| | | | |
|---|---|---|---|
| D. 269,688 | 7/1983 | Molenaar | D21/95 |
| 1,016,383 | 2/1912 | Wellman . | |
| 2,930,135 | 3/1960 | Rodtz, Sr. . | |
| 3,126,928 | 3/1964 | McMillan . | |
| 3,735,497 | 5/1973 | Boettcher | 33/180 |
| 4,793,068 | 12/1988 | Golkar | 33/526 |
| 4,850,114 | 7/1989 | Vockins | 33/526 |
| 4,930,225 | 6/1990 | Phillips | 33/526 |
| 4,951,532 | 8/1990 | Nelson | 81/44 |
| 4,955,142 | 9/1990 | Rieck | 33/526 |

Primary Examiner—Carl D. Friedman
Assistant Examiner—David J. Jersen
Attorney, Agent, or Firm—Diller, Ramik & Wight, PC

[57] ABSTRACT

A spacer or gauge is provided for maintaining accurate spacing between adjacent wooden boards of a deck, patio, walkway or the like incident to the performance of a nailing operation. The spacer is formed from two members, namely, an elongated leg welded in transverse relationship to a support member. A lower flat surface of the support member rests upon and spans adjacent deck boards while a lower leg portion of the elongated leg has opposite substantially parallel space defining surfaces which are spaced a predetermined distance from each other. The space defining surfaces are contacted by opposite edges of the deck boards, and the support member has a pair of apertures which allows a person to view the deck board edges and ascertain that the same are in contact with the space defining surfaces. In this fashion a workman is assured that once the deck boards are nailed in place, the eventually completed deck will be "true" and "square," and the overall appearance of the completed deck will be extremely aesthetic.

18 Claims, 1 Drawing Sheet

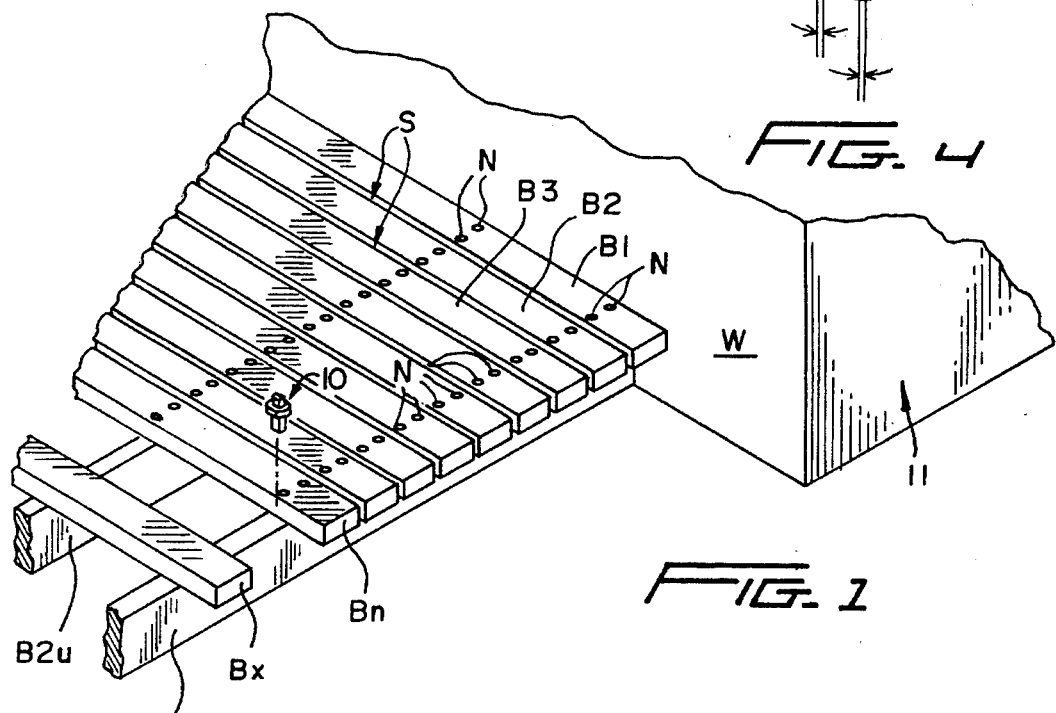

DECK BOARD OR LIKE SPACER

BACKGROUND OF THE INVENTION

The invention is directed to a tool for maintaining two boards in spaced relative relationship to each other, as for example, deck boards or similar wooden boards incident to nailing during the building of a wooden deck, patio, walkway or the like. Typical of spacers for spacing two boards are disclosed in U.S. Pat. No. 3,735,497 (Boettcher) and U.S. Pat. No. 4,955,142 (Rieck). The latter patents each discloses structure for accomplishing the broad concept of board spacing, but each includes the disadvantage of preventing the worker or other person using the spacer from viewing and thereby ascertaining the position of the deck board edges relative to the spacer. Without such visual assurance a workman cannot be certain that the deck board edges contact the spacer and, therefore, cannot be assured that once the deck boards are nailed, the spacing between all adjacent deck boards will be identical. Though a slight deviation between adjacent deck boards is relatively inconsequential, should such occur with some consistency, the overall appearance of the eventually completed wooden deck, walkway or the like will lack uniformity, will not appear "square" to the eye and will be otherwise unaesthetic.

SUMMARY OF THE INVENTION

The invention is directed to spacer, gauge or tool for maintaining wooden boards of a deck, patio, walkway or the like accurately spaced from each other incident to the performance of a nailing operation. The spacer is essentially constructed from two members, namely, an elongated leg which is transverse to a support member. The support member has a lower flat surface adapted to rest upon and span adjacent deck boards, and the elongated leg has opposite upper and lower leg portions with the lower leg portion having opposite substantially parallel space defining surfaces which are spaced a predetermined distance from each other. The space defining surfaces are contacted by opposite edges of the deck boards and the support member has a pair of apertures passing therethrough which allows a person to view the deck board edges and ascertain that the same are in contact with the lower leg portion space defining surfaces. In this fashion a workman is assured that once the boards are nailed in place, the eventually completed deck will be "true" and "square," all spaces will be equal, and the overall appearance of the completed deck will be aesthetic.

In further accordance with the invention, the upper leg portion preferably has a pair of oppositely opening concave recesses which function to allow the spacer to be gripped between a person's thumb and forefinger for ready manipulation, and the lower leg portion of the elongated leg is preferably constructed with the space defining surfaces in converging relationship to each other in a direction toward a terminal end of the lower leg portion to facilitate the withdrawal of the lower leg portion from adjacent deck boards at the completion of the nailing operation.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1 is a fragmentary perspective view, and illustrates a deck board spacer utilized in conjunction with wooden deck boards incident to the building of a wooden deck.

FIG. 2 is an enlarged fragmentary cross-sectional view taken along the line normal to the deck boards of FIG. 1, and illustrates two deck boards nailed in position and the spacer position between one of the latter deck boards and the deck board which is to be nailed in position.

FIG. 3 is a perspective view of the spacer of the present invention, and illustrates an elongated leg having upper and lower leg portions, a support member welded in transverse relationship thereto, and a pair of apertures associated with the support member through which edges of adjacent deck boards can be viewed in relationship to space defining surfaces of the lower leg portion.

FIG. 4 is a side elevational view of the spacer of FIG. 3, and illustrates oppositely opening concave recesses of the upper leg portion for facilitating the gripping of the spacer between a person's thumb and forefinger and the slightly downwardly converging relationship of the space defining surfaces.

DESCRIPTION OF THE PREFERRED EMBODIMENT

A novel deck board or like spacer, gauge or tool constructed in accordance with this invention generally designated by the reference numeral 10, and reference is made to FIGS. 1 and 2 of the drawings in which a house H or the like is shown associated with a partially completed wooden deck D, wooden patio, wooden walkway or the like. The deck D is constructed in a conventional manner by utilizing a plurality of parallel wooden beams B1u, B2u, etc., in parallel relationship to each other which are appropriately connected to a wall W of the house H and normally are supported from below (not shown). A number of identical wooden deck boards B1, B2, B3, etc. are secured by nails N to the beams B1u, B2u with the last of the deck boards nailed to the beams B1u, B2u being designated by the reference numeral Bn (FIGS. 1 and 2). Spaces S between all of the deck boards B1 . . . Bn are equal and are established by the deck board spacer 10 in a manner to be described hereinafter with respect to a deck board Bx which is shown in FIG. 1 simply resting atop the beams B1u, B2u prior to being spaced by the deck board spacer 10 relative to the beam Bn.

Referring specifically to FIGS. 3 and 4 of the drawings, the novel deck board spacer 10 of the present invention includes a generally elongated leg 11 defined by a lower elongated leg portion 12 and an upper leg portion 13. A support member 15 includes central aperture means 16 sized to receive therein the elongated leg 11. The elongated leg 11 is made of metal, as is the support member 15, and these two components are appropriately welded to each other to provide a relatively rigid structure.

The elongated lower leg portion 12 includes a pair of opposite space defining surfaces 21, 22 which are in substantial parallel relationship to each other, but preferably converge slightly relative to each other in a direction toward a terminal end 23 of the lower elongated leg portion 12. The angle of convergence is preferably between 1°–3°, as is indicated by the unnumbered opposing headed arrows associated therewith in FIG. 4.

The upper leg portion 13 includes means for manually gripping the spacer 10 in the form of a pair of oppositely facing, generally shallow concave recesses 31, 32 which essentially are recessed portions of the respective surfaces 21, 22 above the support member 15. When the recesses 31, 32 are gripped between the thumb and forefinger of a workman, the spacer 10 can be readily manipulated or handled and easily inserted between and withdrawn from adjacent deck boards B1–Bn, etc., as will be more apparent hereinafter.

The support member 15 preferably includes opposite generally parallel upper and lower surfaces 41, 42, respectively. The aperture means 16 includes apertures or openings 51, 52 passing through the surfaces 41, 42 with the openings 51, 52 being adjacent the respective space defining surfaces 21, 22. Thus, a workman can look down from above the upper surface 41 through the apertures 51, 52 and determine whether or not edges of the boards B1 . . . Bn are in intimate contact with the space defining surfaces 21, 22. If there is such intimate contact, nailing can proceed and this assures the equality of the distance or spacing S between all adjacent deck boards B1–Bn.

Reference is now made to FIG. 2 of the drawings which illustrates the lower leg portion 12 of the spacer 10 positioned between the last nailed deck board Bn and an unnailed deck board Bx which is to be nailed. The opposite space defining surfaces 21, 22 of the spacer 10 are in intimate contact with respective board edges Ex and En of the respective deck boards Bx and Bn. This intimate contacting relationship is readily apparent to the workman who simply views such contact from above through the respective openings or apertures 51, 52. Upon recognizing that the edges Ex and En are in contact with the respective space defining surfaces 21, 22 of the spacer 10, the board Bx can be nailed to the underlying beams B1$u$ and B2$u$ with, of course, the spacer 10 being withdrawn and reinserted between the deck boards Bn and Bx, as needed, and progressively thereafter in the same manner until the deck D has been completed. Obviously, the tapered or raked surfaces 21, 22 allow the ready upward withdrawal of the spacer 10 from between the board Bx–Bn after nailing the deck board Bx.

Due to the uniformity of the spaces S between all of the deck boards B1 . . . Bn, the eventual deck D) is "true," "square" and aesthetically pleasing.

Although a preferred embodiment of the invention has been specifically illustrated and described herein, it is to be understood that minor variations may be made in the apparatus without departing from the spirit and scope of the invention, as defined the appended claims.

I claim:

1. A deck board or like spacer for establishing a predetermined space between a pair of deck boards comprising a generally elongated leg adapted to be inserted between a pair of spaced adjacent generally parallel deck boards, said elongated leg having a pair of opposite space defining surfaces each adapted to contact an edge of an associated one of the pair of deck boards to thereby establish a desired predetermined space between the pair of deck boards incident to performing a nailing operation, a support member disposed generally transverse to said elongated leg, said support member having an upper surface and a lower surface adapted to rest upon an upper surface of the pair of deck boards, and aperture means in said support member through which said pair of opposite space defining surfaces are viewable from above said support member upper surface whereby a person can visually determine the existence of contact between each deck board edge and an adjacent space defining surface.

2. The deck board or like spacer as defined in claim 1 including means for manually gripping said spacer.

3. The deck bard or like spacer as defined in claim 1 including means projecting above said support member upper surface for manually gripping said spacer.

4. The deck board or like spacer as defined in claim 1 wherein said aperture means are defined by a pair of apertures, and each aperture is constructed and arranged to view therethrough one of said pair of opposite space surfaces.

5. The deck board or like spacer as defined in claim 1 wherein said elongated leg has a terminal end, and said pair of opposite space defining surfaces converge relative to each other in a direction toward said terminal end.

6. The deck board or like spacer as defined in claim 1 wherein said pair of opposite space defining surfaces are in substantial parallel relationship to each other.

7. The deck board or like spacer as defined in claim 1 including means projecting above said support member upper surface for manually gripping said spacer, and said projecting means include a pair of oppositely opening concave recesses adapted to be gripped by a person's thumb and forefinger.

8. The deck board or like spacer as defined in claim 1 wherein said elongated leg includes an upper leg portion above said support member, and said upper leg portion includes means for manually gripping said spacer.

9. The deck board or like spacer as defined in claim 1 wherein said elongated leg includes an upper leg portion above said support member, said upper leg portion includes means for manually gripping said spacer, and said gripping means are a pair of oppositely opening concave recesses in said upper leg portion adapted to be gripped by a person's thumb and forefinger.

10. The deck board or like spacer as defined in claim 1 wherein said support member upper and lower surfaces are in substantially parallel relationship to each other.

11. The deck board or like spacer as defined in claim 4 wherein said elongated leg has a terminal end, and said pair of opposite space defining surfaces converge relative to each other in a direction toward said terminal end.

12. The deck board or like spacer as defined in claim 4 including means projecting above said support member upper surface for manually gripping said spacer, and said projecting means include a pair of oppositely opening concave recesses adapted to be gripped by a person's thumb and forefinger.

13. The deck board or like spacer as defined in claim 4 wherein said elongated leg includes an upper leg portion above said support member, and said upper leg portion includes means for manually gripping said spacer.

14. The deck board or like spacer as defined in claim 4 wherein said elongated leg includes an upper leg portion above said support member, said upper leg portion includes means for manually gripping said spacer, and said gripping means are a pair of oppositely opening concave recesses in said upper leg portion adapted to be gripped by a person's thumb and forefinger.

15. The deck board or like spacer as defined in claim 12 wherein one concave recess and one of said pair of opposite space defining surfaces and apertures are located on each of opposite sides of said elongated leg.

16. The deck board or like spacer as defined in claim 15 wherein said elongated leg has a terminal end, and said pair of opposite space defining surfaces converge relative to each other in a direction toward said terminal end.

17. The deck board or like spacer as defined in claim 15 wherein said pair of opposite space defining surfaces are in substantial parallel relationship to each other.

18. The deck board or like spacer as defined in claim 16 wherein said pair of opposite space defining surfaces are in substantial parallel relationship to each other.

* * * * *